Nov. 5, 1940.　　　R. LA VASSEUR　　　2,220,468
HINGE MOUNTING DEVICE
Filed Jan. 23, 1939
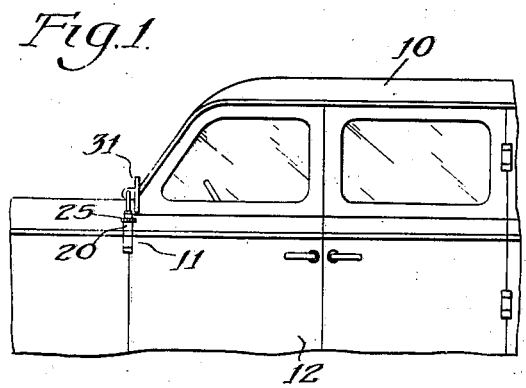
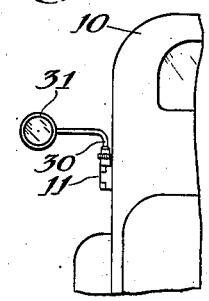
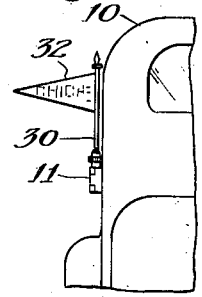
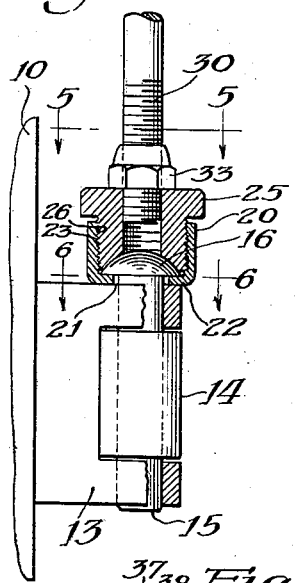
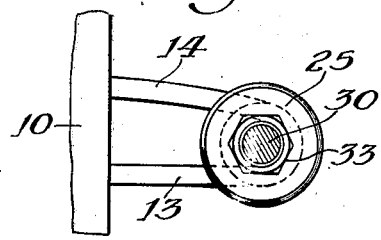
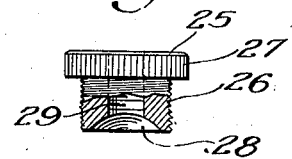
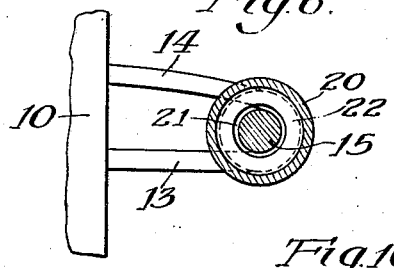
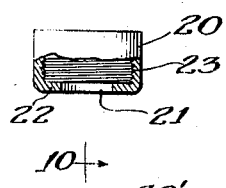
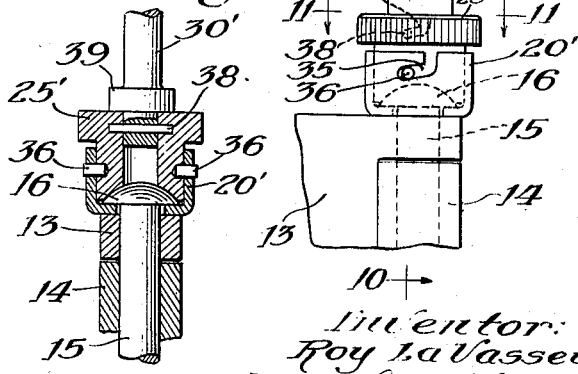
Inventor:
Roy LaVasseur,
By L. & J. Gary
Attorney Patented Nov. 5, 1940

2,220,468

UNITED STATES PATENT OFFICE 2,220,468

HINGE MOUNTING DEVICE

Roy La Vasseur, Chicago, Ill., assignor to Superior Parts Company, Chicago, Ill., a firm consisting of Roy La Vasseur and H. F. Brodt Application January 23, 1939, Serial No. 252,359

4 Claims. (Cl. 248—205)

This invention relates to improvements in mounting devices, and particularly to a device for mounting objects on automobiles by means of a door hinge thereof.

Various objects such as rear view mirrors, pennants, advertisement signs, radio antennae and the like have usually heretofore been mounted on automobiles by means of special mounts, holders or clamps requiring special and specific installation, and usually accompanied by a drilling operation, all of which are laborious and expensive, and non-interchangeable. The door hinges and hinge pins have also been utilized in combination with such mounting devices, but these devices have likewise been adapted solely for a single type of attachment such as a rear view mirror. Even in such installations elaborate and special equipment has been necessary and require at least the replacement of the hinge pin.

The object of this invention is to provide a mounting device adapted for installation on conventional automobile door hinges by means of the contained hinge pin thereof.

Another object is to provide a universal mounting device adapted for installation on automobile door hinges by means of the hinge pin thereof, regardless of the hinge pin size, within the range of conventional automobile door hinge construction.

A further object is to provide a device for mounting objects conveniently on the door hinge of an automobile, which is adapted to interchangeably receive and support various suitable objects.

Further objects relate to ease, economy and rapidity of installation, the economy of construction, and the details and arrangements of the parts of my invention, which will be apparent from a consideration of the following specification and drawing, wherein:

Fig. 1 is a side view of a portion of an automobile showing my mounting device positioned on a front door hinge and supporting a rear view mirror.

Fig. 2 is a fragmentary rear end view of the automobile shown in Fig. 1, further illustrating the positioning of my mounting device on the door hinge, and the support thereby of the rear view mirror.

Fig. 3 is a view similar to that of Fig. 2, illustrating the support by means of my mounting device of a vertical rod and attached pennant.

Fig. 4 is a fragmentary elevation, with parts broken away and parts in section illustrating my mounting device positioned on the door hinge of an automobile by means of the hinge pin thereof, and supporting an object mounted thereby.

Fig. 5 is a section on the line 5—5 of Fig. 4.

Fig. 6 is a section on the line 6—6 of Fig. 4.

Fig. 7 is a detailed view, partly in section of the mounting head portion of my device.

Fig. 8 is a detailed view partly in section of the seat portion of my device.

Fig. 9 is a fragmentary elevation of a modified form of my mounting device in operative engagement.

Fig. 10 is a partial section on the line 10—10 of Fig. 9.

Fig. 11 is a section on the line 11—11 of Fig. 9, and,

Fig. 12 is a detailed view partly in section of the mounting head portion of my modified construction shown in Figs. 9 to 11.

Referring to the drawing, 10 indicates an automotive vehicle provided with a conventional hinge 11, adjacent the middle of the edge of the door 12, which forms a convenient point for mounting objects of the class herein contemplated. The hinge comprises the two halves 13 and 14 secured to the door post and door, and are connected together by a conventional hinge pin 15 provided with the usual button head 16.

My improved mounting device comprises two sections, one a cup-like seat adapted to rest on the upper edge of a door hinge and be held in place by the door hinge pin, and the other a mounting head adapted to nest within the seat and to lodge against the hinge pin head and form a centering means, and which is provided with a central bore adapted to receive the shank of the article to be mounted.

Thus, referring to my preferred form of construction shown in Figs. 4 to 8, the seat 20, is a relatively thin cup-like member provided with an enlarged central opening 21 in its relatively flat bottom 22, and is internally threaded as at 23. The flat bottom permits the seat to rest on the hinge portion 13. The opening 21 is of sufficient diameter to accommodate varying sizes of hinge pins within the conventional range of automotive vehicle usage, so that my units will be of unrestricted adaptability and will not require production in varying sizes. In mounting the seat 20, the hinge pin 15 is removed from the hinge, extended through the opening 21 of seat 20, and replaced in the hinge. It will be noted that due to the shell-like and flat bottomed construction of seat 20, the vertical displacement of the hinge pin in the hinge is very little, so that the same pin may be retained and used without impairing its efficiency, or the requirement of a new pin.

The mounting head 25 is in the form of a plug, and is provided with an external thread 26 adapted to engage the thread 23 of the seat member 20, and may readily be manipulated by means of the knurled flange 27. The bottom of the plug 25 is formed with a concavity or socket 28 adapted to seat the button head 16 of the hinge pin. This concavity not only brings about greater compactness of my device by forming a seat for the pin head, but in addition forms a centering means for the entire mounting unit and compensates for any difference in diameter between the opening 21 and hinge pin 15. Thus when the plug 25 is screwed into the seat 20 the socket 28 engages the head 16 and causes the seat 20 to be centered with respect to the axis of the hinge pin 15.

The plug 25 is provided with a central threaded bore 29 to receive a threaded shank 30 of the article to be mounted, such as the rear view mirror 31, the pennant 32, or any other suitable accessory such as a radio antenna. A lock nut 33 may be provided to more securely position the mounted article on the mounting head.

The modified form of construction shown in Figs. 9 to 12, is essentially the same as that previously described, but shows another means of engaging the plug member to the seat member, and the shaft of the mounted article within the mounting head plug, by means of bayonet slots and pins.

Thus the seat 20' is provided with a pair of opposed bayonet slots, such as 35, and the plug member 25' is provided with a pair of opposed pins 36 which ride in the slots and by means of a cam-like action, the plug 25' is engaged in the seat 20' with the pin head 16 seated in the socket of the plug 25'. Likewise the bore 29' of the plug is provided with a pair of bayonet slots, such as at 37 and is adapted to receive and engage the pin 38 extending through the end of the shank 30' of the accessory to be mounted. In this instance the shank 30' may be provided with a collar 39 to aid in the engagement of the pin 38 in the slots 37 and hold the parts clamped by the cam-like interengagement.

It will thus be seen that the seat and mounting head plug portions of my device may be interengaged by various means, such as the two methods illustrated, or any equivalent thereof, and likewise the article to be mounted or supported by means of my device may be engaged thereto by at least the two methods shown, and of course a combination of the two methods shown, or their equivalents may be used, without departing from the spirit of my invention.

I claim as my invention:

1. A mounting device of the class described comprising a cup-like seat member provided with an enlarged opening in the base thereof, adapted to receive the shank of a door hinge pin therethrough and to be engaged to a door hinge by means of the head of said hinge pin, and a plug member adapted to be engaged within said seat and against said hinge pin head, and comprising means adapted to aline said seat and plug axially of said hinge pin, the said plug being formed with a central bore adapted to receive and position a shank portion of an article to be mounted thereby.

2. A mounting device of the class described comprising a cup-like seat member provided with an enlarged opening in the base thereof adapted to receive a door hinge pin and to position said seat member by means of the head of said hinge pin against the upper edge of a door hinge, and provided with an internal thread, and a plug member provided with an external thread, adapted to be engaged within said seat and provided with a socket concavity in the base thereof adapted to receive the hinge pin head and to thereby axially aline said seat and said plug with said hinge pin, the said plug being formed with a central threaded bore adapted to receive and position the threaded end portion of an article to be mounted thereby.

3. A mounting device of the class described comprising a cup-like seat member provided with an enlarged opening in the base thereof adapted to receive a door hinge pin and to position said seat member by means of the head of said hinge pin against the upper edge of a door hinge and provided with bayonet slots opening from the peripheral edges thereof, and a plug member provided with a pair of opposed radially extending pins, adapted to be engaged within said seat and provided with a socket concavity in the base thereof adapted to receive the hinge pin head and to thereby axially aline said seat and said plug with said hinge pin, the said plug being formed with a central bayonet slotted bore adapted to receive and position a complementary end portion of an article to be mounted thereby.

4. A mounting device of the class described, comprising a substantially cup-shaped seating member formed with an enlarged opening in the base thereof adapted to receive the shank of a conventional hinge pin of the class described and to hold the head thereof lodged therewithin, and a mounting head plug adapted to be rotatably engaged within said seat and formed with a concavity in the base thereof adapted to form a socket for a hinge pin head of the button type and to form axial alignment means therewith, the said plug being provided with a central bore adapted to receive and position a shank of an article to be mounted thereby formed with complementary engageable means.

ROY LA VASSEUR.